United States Patent [19]

Teramachi

[11] Patent Number: 4,939,946
[45] Date of Patent: Jul. 10, 1990

[54] COMPOSITE MOTION GUIDE DEVICE

[76] Inventor: Hiroshi Teramachi, 2-34-8, Higashi-Tamagawa, Setagaya-Ku, Tokyo, Japan

[21] Appl. No.: 185,168

[22] Filed: Apr. 22, 1988

[30] Foreign Application Priority Data

Mar. 5, 1988 [JP] Japan .................................. 63-52460

[51] Int. Cl.$^5$ ............................................ F16H 25/22
[52] U.S. Cl. ............................ 74/89.15; 74/424.8 R; 74/459; 384/43; 384/517
[58] Field of Search ............... 74/459, 424.8 R, 89.15; 384/517, 551, 563, 43

[56] References Cited

U.S. PATENT DOCUMENTS

| | | | |
|---|---|---|---|
| 2,936,645 | 5/1960 | Morris et al. ................... | 74/424.8 R |
| 3,638,507 | 2/1972 | Orner ............................. | 74/424.8 R |
| 3,673,886 | 7/1972 | Tomita et al. ................... | 74/424.8 R |
| 3,720,116 | 3/1973 | Better et al. .................... | 74/459 |
| 3,722,312 | 3/1973 | Better et al. .................... | 74/459 |
| 3,851,541 | 12/1974 | Ploss et al. ..................... | 74/459 |
| 4,123,121 | 10/1978 | Ernst et al. ..................... | 384/43 |
| 4,139,242 | 2/1979 | Ernst et al. ..................... | 384/43 |
| 4,205,885 | 6/1980 | Ernst et al. ..................... | 384/43 |
| 4,206,951 | 6/1980 | Ernst et al. ..................... | 384/43 |
| 4,239,298 | 12/1980 | Ernst et al. ..................... | 384/43 |
| 4,311,348 | 1/1982 | Olschewski et al. ............. | 384/43 |
| 4,328,999 | 5/1982 | Olschewski et al. ............. | 384/43 |
| 4,438,986 | 3/1984 | Teramachi ..................... | 74/424.8 R X |
| 4,523,864 | 6/1985 | Walter et al. ................... | 384/517 X |
| 4,542,661 | 9/1985 | Teramachi ..................... | 74/424.8 R X |
| 4,764,154 | 8/1988 | Teramachi ..................... | 384/517 X |

FOREIGN PATENT DOCUMENTS

| | | | |
|---|---|---|---|
| 3244508 | 6/1984 | Fed. Rep. of Germany ..... | 74/424.8 R |
| 3621381A | 6/1986 | Fed. Rep. of Germany ...... | 384/551 |
| 62-49070 | 3/1987 | Japan ............................. | 74/424.8 R |
| 62-165057 | 7/1987 | Japan ............................. | 74/424.8 R |
| 1023637 | 3/1966 | United Kingdom ................ | 384/517 |

Primary Examiner—Allan D. Herrmann
Attorney, Agent, or Firm—Kenyon & Kenyon

[57] ABSTRACT

A composite motion guide unit comprises a single shaft having ball screw groove and a ball spline groove in an outer peripheral surface thereof in an overlapped manner, a nut mounted on the shaft through a number of balls, and a spline outer sleeve mounted on the shaft through a number of balls. The composite motion guide unit is incorporated in a housing, as a composite motion guide device, in which the nut and the spline outer sleeve are rotatably mounted through respective pairs of support bearings incorporating a number of balls, and the nut and said spline outer sleeve are independently driven through power transmission members. The balls interposed between the nut and the shaft are pre-loaded in an axial direction thereof, balls incorporated in the support bearing in support of the nut are pre-loaded, and balls interposed between the spline outer sleeve and the shaft are pre-loaded in a substantially rotating direction thereof.

9 Claims, 11 Drawing Sheets

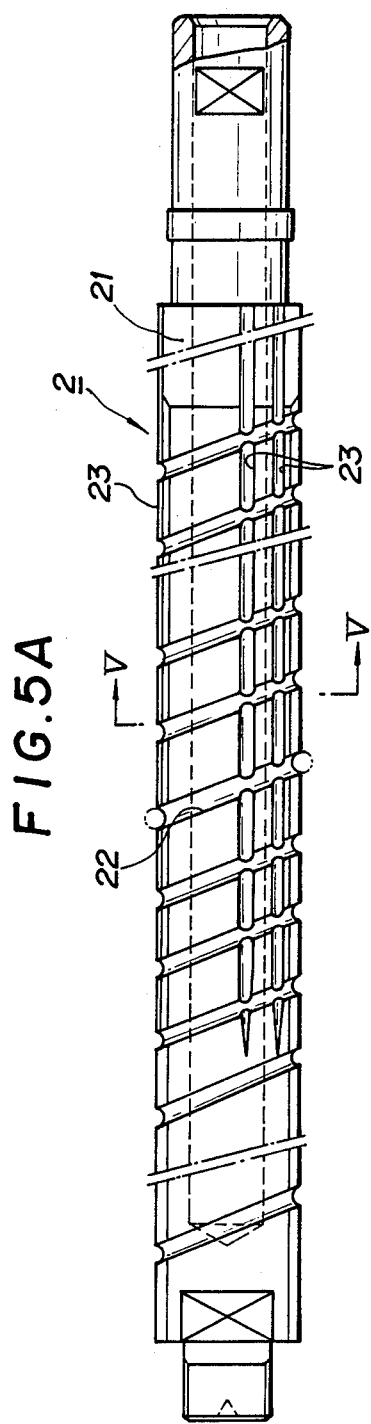
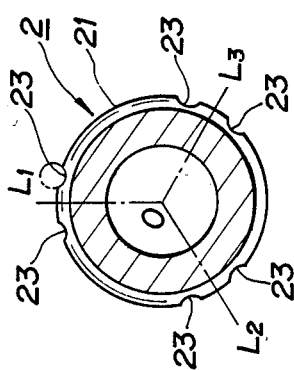
FIG.5A
FIG.5B

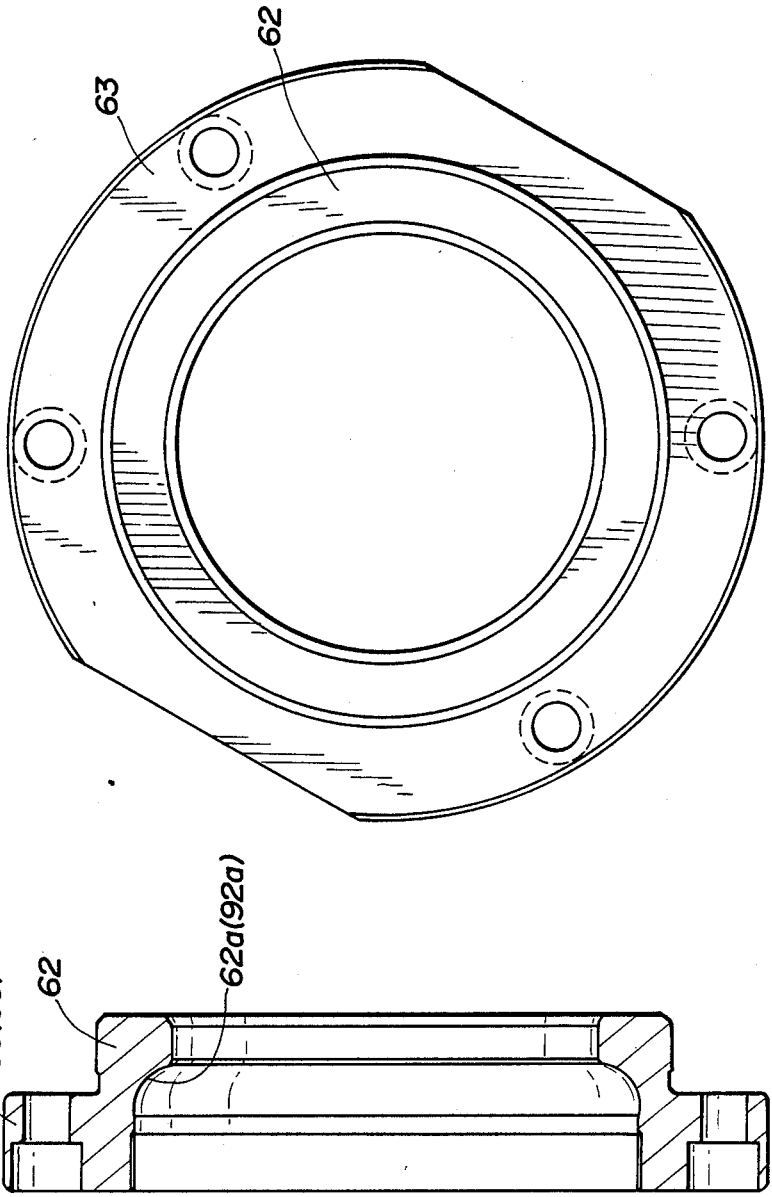

72(82)
72a(82a)

72

COMPOSITE MOTION GUIDE DEVICE

BACKGROUND OF THE INVENTION

The present invention relates to a guide device for use in, for example, an arm of an industrial robot and, more particularly, to a guide device for guiding an object which performs a composite motion composed of axial linear movement and rotational movement.

A known guide device for composite motion incorporate a shaft which is provided in the outer peripheral surface thereof with ball screw grooves and ball spline grooves which are formed on the same portion of the shaft in an overlapping manner, thereby to provide a large stroke of the composite motion. (See, for example, Japanese Patent Laid-open Publication No. 62-165057) More specifically, this type of known guide device has a nut mounted on the shaft through the intermediary of balls which are received in and guided by the ball screw grooves, and an outer spline sleeve mounted on the shaft through the intermediary of balls received in and guided by the ball spline grooves. The nut and the outer spline sleeve are received in a common housing. Each of the nut and the outer spline sleeve is rotatably supported in the housing through a pair of support bearing. Thus, the nut and the outer spline sleeve are independently rotatable. In operation, the nut and the outer spline sleeve are selectively rotated so as to enable the shaft to move axially, to rotate or to perform a composite motion composed of axial motion component and rotational motion component.

Problems encountered with this known device can broadly be sorted into three categories (A), (B) and (C).

(A) There exist inevitable play or looseness of the spline outer sleeve and the ball screw nut. Such looseness causes a phase delay particularly when the apparatus is started, and impairs the precision of stopping position.

(1) Referring first to the spline outer sleeve, critical looseness exists in the direction of rotation, because the rotational position is determined by the outer spline sleeve, while the ball screw nut is designed to rotate freely.

In the guide device of the type which has ball screw grooves and ball spline grooves in an overlapping manner, the shaft has to have a circular cross-section to enable the ball screw nut to rotate thereon through the balls which roll along the ball screw grooves formed in the outer peripheral surface of the shaft. On the other hand, the ball spline grooves are designed as radial ball spline as specified by Japanese Industrial Standards as shown in FIG. 14. Thus, the guide device as a whole is not designed to provide a rigid support against load which acts in the angular direction, though is serves satisfactorily to bear radial load. For these reasons, it has been difficult to satisfactorily eliminate any play in the direction of rotation.

(2) Referring now to the ball screw nut, the criticalness of the play exists in the axial direction, because the ball screw nut is required to regulate the position in the axial direction, while the spline outer sleeve is allowed to freely slide in the axial direction.

In the device of the type described, a moment of force is imparted by the shaft to the ball screw nut such as to rotate or twist the ball screw nut. This essentially requires that the nut is stably supported at its outer peripheral surface by a radial contact type bearing. This type of bearing, however, is not so rigid against any axial load, so that the guide device as a whole inevitably showed a play or looseness in the axial direction.

(B) The second problem is that fletching corrosion tends to be caused in the ball rolling surfaces due to the presence of play or looseness of the spline outer sleeve and the ball screw nut. The term "fletching corrosion" is used in this specification to mean wear of one or both of mutually contacting surfaces due to repeated minute relative sliding between these surfaces.

(1) A discription will be made hereinunder as to the fletching corrosion on the ball screw nut attributable to looseness of fit of the spline outer sleeve. When the rotating shaft is stopped abruptly, the shaft is displaced in the rotational direction due to inertia, because the balls supporting the spline outer sleeve are elastically deformed. When the elastically deformed balls rebound, the shaft is forced back in the rotational direction, whereby a vibration of the shaft takes place in the rotational direction. This vibration causes a minute vibratory slide between the balls and the ball rolling surfaces of the ball screw nut, resulting in local fletching corrosion of the ball rolling surfaces. As a result, local minute pits are formed in these ball rolling surfaces, thereby impairing smooth rolling of the balls.

(2) Fletching corrosion on the ball spline outer sleeve, attributable to axial play of the ball screw nut, takes place as follows.

When the axially running shaft is stopped abruptly, the shaft is displaced in the axial direction due to inertia, because the balls supporting the ball screw nut or balls of bearings are elastically deformed. When the elastically deformed balls rebound, the shaft is forced back in the axial direction, whereby a vibration of the shaft takes place in the axial direction. This vibration causes a minute vibratory slide between the balls and the ball rolling surfaces of the spline outer sleeve, resulting in local fletching corrosion of the ball rolling surfaces.

(C) The third problem is that the balls supporting the ball screw nut tend to be demaged due to the presence of radial play of the spline outer sleeve.

(1) When the guide device of this type is used in an industrial robot arm, the robot arm is usually fixed to the spline outer sleeve, so that the radial load is borne by the spline outer sleeve.

When a heavy lateral load is applied to the end of the shaft when the latter is in the extended state, an excessively heavy load is applied to the spline outer sleeve, resulting in a radial rattle of the spline outer sleeve. This radial rattle of the spline outer sleeve causes the shaft to oscillate in such a manner as to "twist" or "skew" the ball screw nut which fits in the same housing. In consequence, balls in both axial ends of the nut are overloaded to be elastically deformed, allowing a vibration to occur and to impair smooth circulation of the balls. In the worst case, the balls are damaged seriously.

(2) In the case where a play or looseness of the spline outer sleeve exists, the shaft minutely vibrates when the machine, e.g., a robot, is abruptly stopped, with the result that fletching corrosion is caused in the ball rolling surfaces on the ball screw nut.

(3) It is also to be understood that any radial play of the spline outer is amplified at the free end of the shaft, resulting in a degradation of the precision.

SUMMARY OF THE INVENTION

Accordingly, an object of the present invention is to substantially eliminate the defects or problems in the conventional technique and to provide a guide device for composite motion having a nut and a spline outer sleeve mounted in a common housing, wherein any looseness in the axial and rotational directional is eliminated to improve the response characteristic and positioning precision.

Another object of the present invention is to ensure smooth operation of the guide device of the type described, through elimination of fletching corrosion on the nut and spline outer sleeve attributable to looseness of the spline outer sleeve in the rotational direction and looseness of the nut in the axial direction.

Still another object of the invention is to ensure smooth operation of the guide device of the type described, by preventing occurrence of fletching corrosion on the nut through elimination of overloading of balls in the nut, by eliminating radial looseness of the support bearing on the spline outer sleeve so as to prevent radial oscillation.

A further object of the present invention is to increase the load bearing capacity of the guide device both in the axial and radial directions, as well as resistance to moment of force, by increasing rigidity of the support bearings supporting the nut and the spline outer sleeve.

These and other objects can be achieved, according to the present invention, by providing a composite motion guide device comprising a single shaft having ball screw groove and ball spline groove formed in the outer peripheral surface thereof in an overlapping manner, a nut mounted on the shaft through a number of balls, a spline outer sleeve mounted on the shaft through a number of balls, a housing in which the nut and the spline outer sleeve are rotatably mounted through respective pair of support bearings, and power transmission members through which the nut and the spline outer sleeve are driven independently, wherein the balls between the nut and the shaft are pre-loaded in the direction of axis of the shaft the balls incorporated in the support bearing in support of the nut are pre-loaded, and the balls between the spline outer sleeve and the shaft are pre-loaded directions approximating the direction of rotation.

The support bearing in support of the spline outer sleeve may have an angular-type construction, with its balls adequately pre-loaded.

The support bearings in support of the nut and the spline outer sleeve may be constituted by means of balls which roll on the surfaces of the nut and the spline outer sleeve serving as inner races and outer races fixed in the housing.

In the composite guide device of the type described, balls between the shaft and the nut are suitably pre-loaded. In addition, the support bearings have angular-contact type structure with the balls adequately pre-loaded. The guide device therefore exhibits superior rigidity in the axial direction, so that the any looseness in the axial direction can be completely eliminated. The minute axial vibratory motion of the shaft with respect to the housing, which inevitably is caused in the prior art device when the shaft is abruptly stopped, can be eliminated so as to prevent fletching corrosion on the spline outer sleeve.

The balls between the spline outer sleeve and the shaft also are pre-loaded in the direction of rotation, so that the guide device exhibits a high rigidity in the direction of rotation, thus completely eliminating any looseness in the direction of rotation. In consequence, fletching corrosion on the nut, which is attributable to the looseness of the shaft in the direction of rotation, is avoided.

Provided that the support bearing for supporting the spline outer sleeve is constructed as an angular contact type bearing with its balls pre-loaded, a high rigidity is obtained also in the radial direction, whereby the looseness of the spline outer sleeve in the radial direction can be completely eliminated. It is therefore possible to eliminate moment of force which acts to twist the nut and which is caused by oscillation of the shaft can be completely eliminated, thus preventing any overload of the balls between the nut and the shaft. Fletching corrosion on the nut due to radial looseness of the spline outer sleeve also can be avoided. It is also to be understood that the guide device can have a reduced size, provided that the nut and the spline outer sleeve are used as the inner races of the support bearings.

BRIEF DESCRIPTION OF THE DRAWINGS

FIG. 5A is a front elevational view of the shaft of the device shown in FIG. 1;

FIG. 5B is a sectional view taken along the line V—V of FIG. 5a;

FIG. 12A is a vertical sectional view of an outer race of the support bearing shown in FIG. 1;

FIG. 12B is a front elevational view of the outer race of FIG. 12A;

DESCRIPTION OF THE PREFERRED EMBODIMENTS

Figure 1:
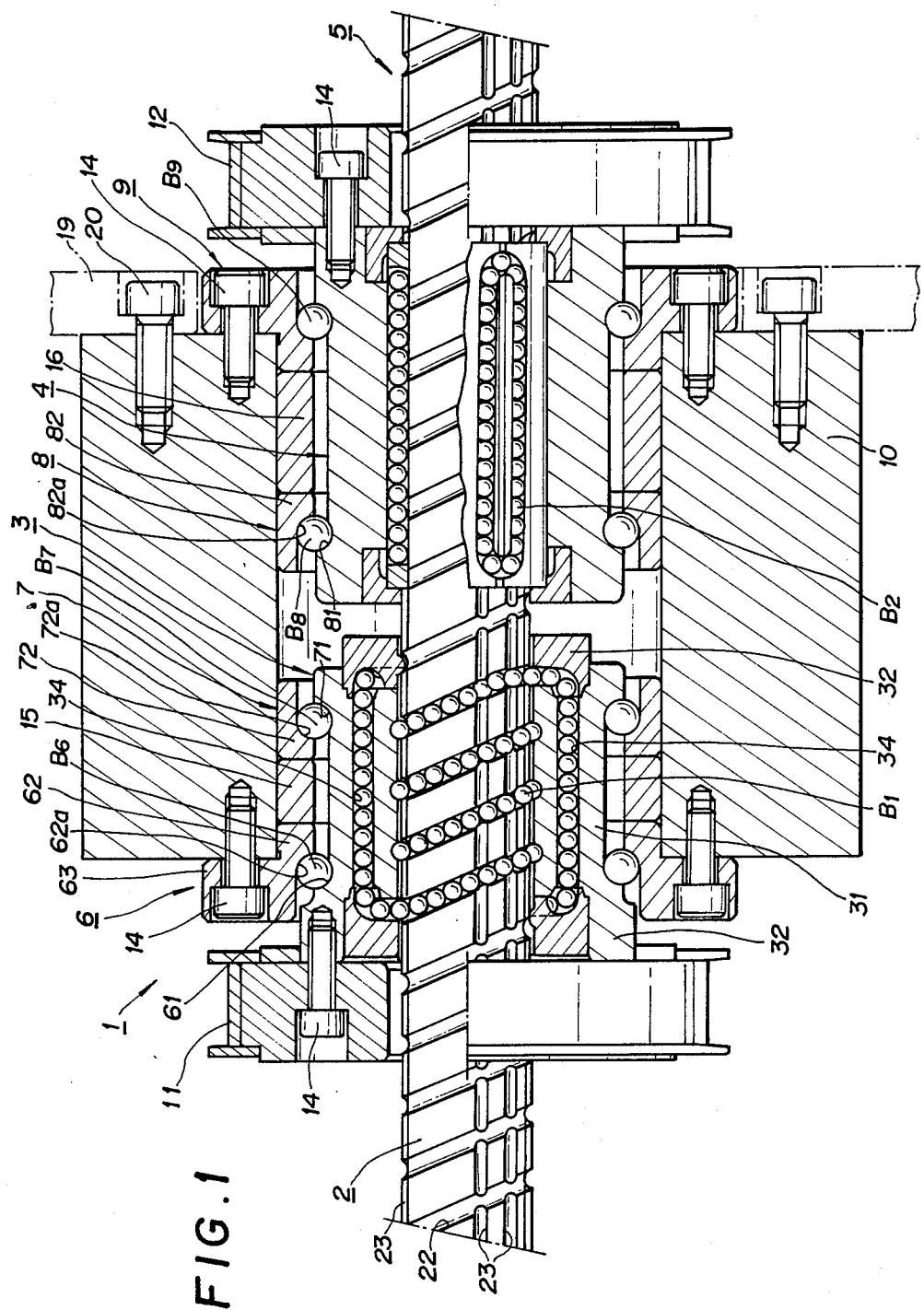
FIG. 1 is a longitudinal sectional view of an embodiment of the composite motion guide device in accordance with the present invention.
Figure 2:
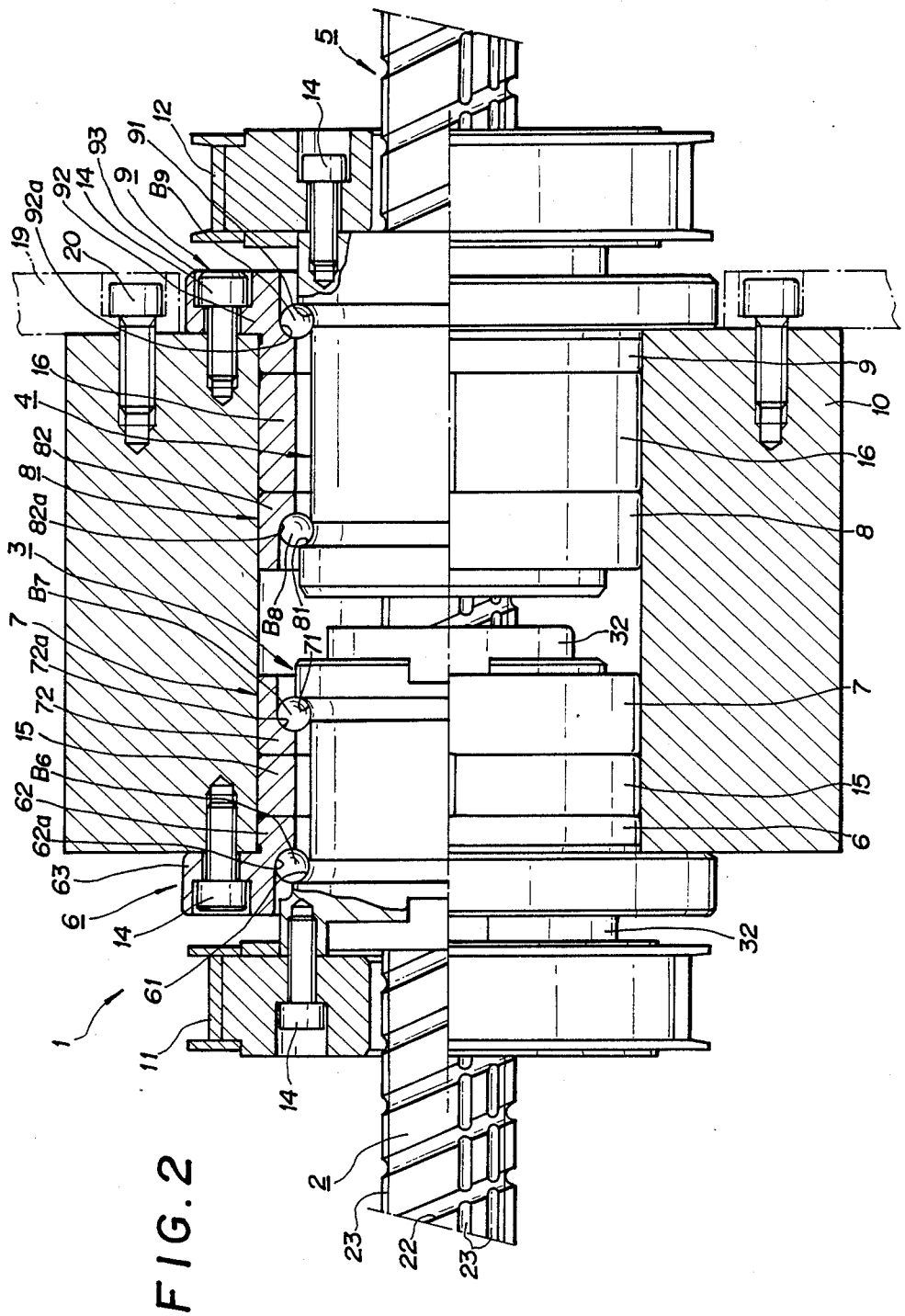
FIG. 2 is a partly-sectioned front elevational view of the device in accordance with the present invention.

An embodiment of the present invention will be described with reference to the accompanying drawings.

FIGS. 1 through 13 show an embodiment of the guide device of the present invention for guiding an object which performs a composite motion.

A guiding device 1 generally comprises a composite motion guide unit 5 including a shaft 2 and a ball screw nut 3 and a ball spline outer sleeve 4 which are mounted on the shaft 2, a housing 10 which supports the nut 3 and the spline outer sleeve 4 through pairs of support bearings 6,7 and 8,9, respectively, and pulleys 11, 12 servings as power transmitting members for driving the nut 3 and the spline outer sleeve 4.

Referring first to the composite motion guide unit 5, the shaft 12 has a single shaft member 21 in the outer peripheral surface of which are formed spiral ball screw grooves 22 and a plurality of ball spline grooves 23 which extend in the axial direction such that the grooves 22 and 23 cross and overlap each other, as will be best seen from FIG. 5A and 5B. The shaft member 21 is a hollow rod having a circular profile, so that its weight and, hence, influence of inertia at the times of start and stop are reduced, though the shaft member 21 may be a solid rod having a circular cross-section. In the described embodiment, the ball screw grooves 22 are formed as a double screw thread with a comparatively large lead, whereby the load bearing capactiy is increased while attaining a high speed of feed. In this embodiment, the ball groove 23 has Gothic arch type configuration when viewed in cross-section. The ball spline groove 23 is provided in plural. Thus, a plurality of ball spline grooves 23, six grooves in the illustrated embodiment, are arranged in the circumferential direction of the shaft 2. More specifically, these ball spline grooves 23 are arranged in three pairs, the grooves 23 of each pair are disposed in symmetry with respect to each of a three imaginary radial lines $L_1$, $L_2$ and $L_3$ radiating from the center O of the shaft so as to divide the cross-section of the shaft into three sector regions of an equal area. Each ball spline groove 23 has a circular arc form having an arcuate cross-section.

The nut 3 of the composite motion guide device is a substantially cylindrical unit composed mainly of a nut member 31 and end caps 32,32 secured to both axial ends of the nut member 31. The nut member 31 is provided in the inner peripheral surface thereof with a couple of ball screw grooves 33 corresponding to the ball screw grooves on the shaft. The nut member 31 is provided with a ball recirculating bores 34, 34 through which a multiplicity of balls $B_1$ through which the nut member 31 is carried by the shaft 2 are recirculated. Each of the end cap 32 is provided with ball turning grooves 35 which serve to turn the direction of the balls $B_1$ from the passages formed between the ball screw groove 22, 33 of the shaft 2 and the nut 3 into the ball recirculating grooves 34,34 and vice versa. In consequence, a pair of ball circulating passages are formed by the passages formed between the ball screw groove 22, 33 of the shaft 2 and the nut 3, the ball turning grooves 35, 35, and the ball recirculating bores 34, 34. A multiplicity of balls in the form of a train circulate along the respective ball circulating passage.

Figure 3:
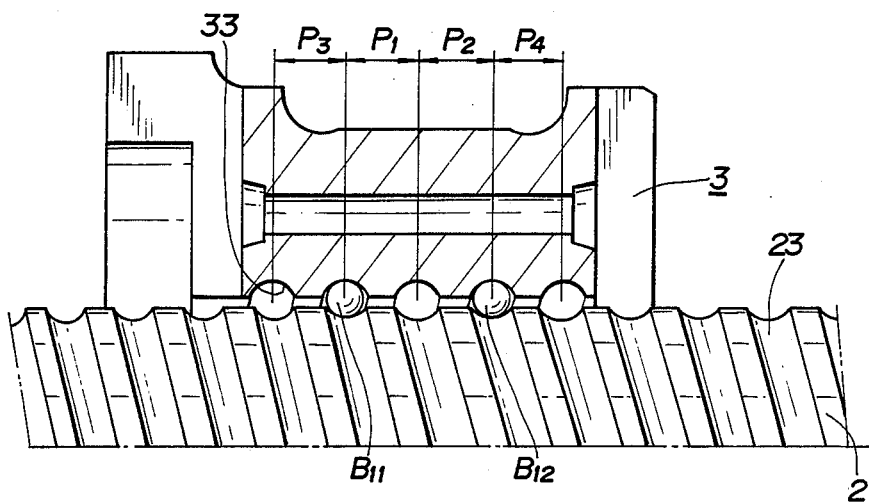
FIG. 3 is a sectional view of a nut in the device of FIG. 1, illustrating the state of contact of balls in the nut.
Figure 4:
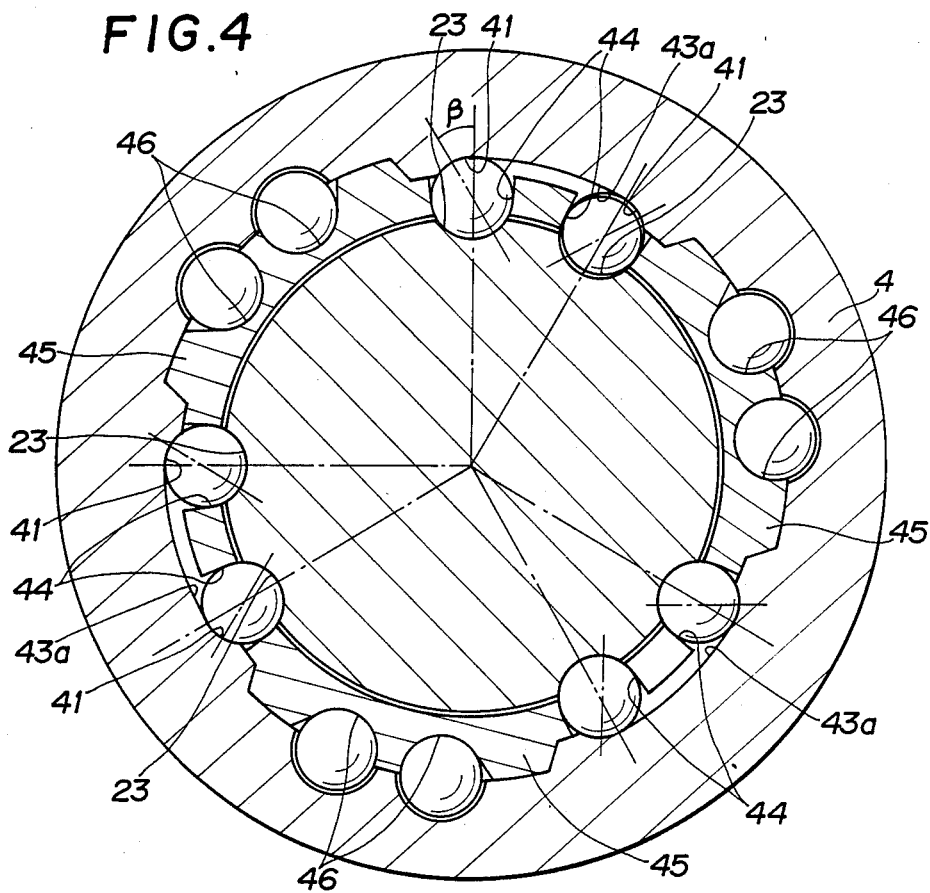
FIG. 4 is a sectional view of a spline outer sleeve of the device shown in FIG. 1 illustrating the state of contact of balls in the spline outer sleeve.
Figure 6D:
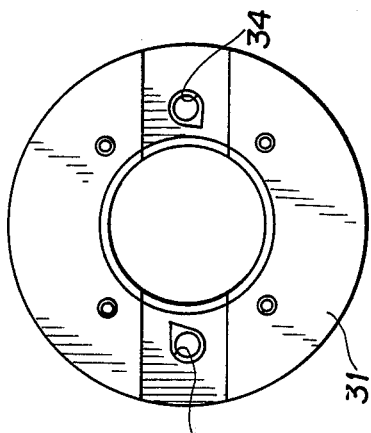
FIG. 6D is a right-hand side elevational view of FIG. 6A.
Figure 6A:
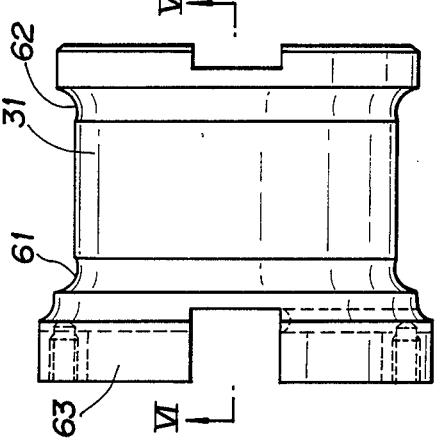
FIG. 6A is a front elevational view of a nut member of the nut incorporated in the device of FIG. 1.
Figure 6B:
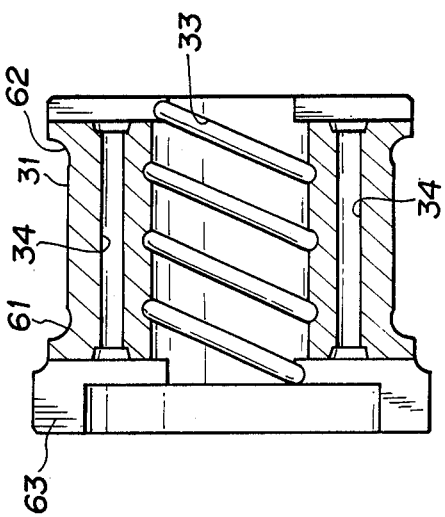
FIG. 6B is a sectional view taken along the line VI—VI of FIG. 6A.
Figure 6C:
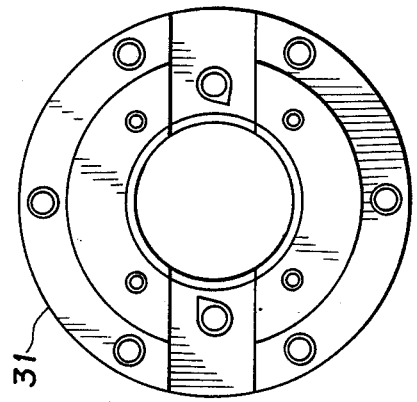
FIG. 6C is a left-hand side elevational view of FIG. 6A.
Figure 7A:
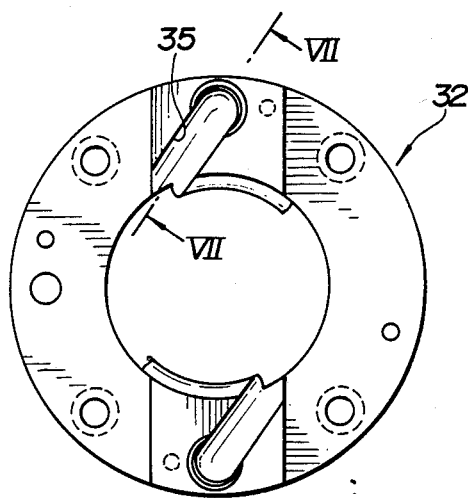
FIG. 7A is a front elevational view of a nut end cap.
Figure 7B:
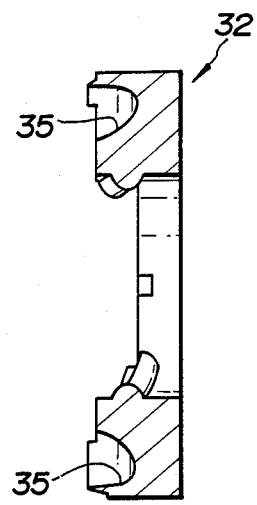
FIG. 7B is a vertical sectional view of FIG. 7A.
Figure 7C:
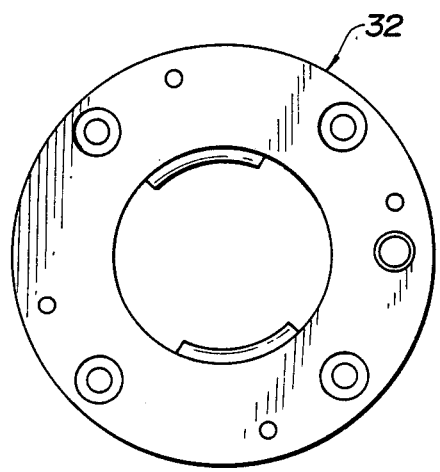
FIG. 7C is a rear elevational view of the nut end cap shown in FIG. 7A.
Figure 7D:
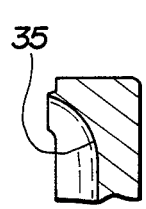
FIG. 7D is a sectional view taken along the line VII—VII of FIG. 7A.
Figure 8A:
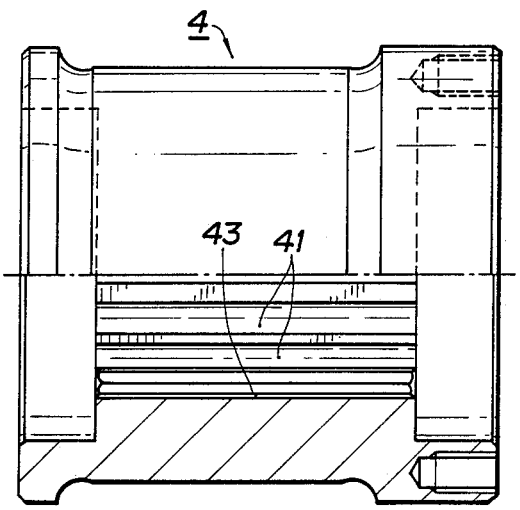
FIG. 8A is a sectional view of the spline outer sleeve in the device of FIG. 1.
Figure 8B:
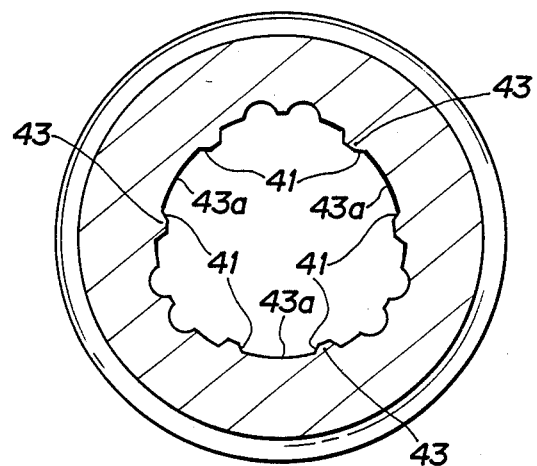
FIG. 8B is a side elevational view of the spline outer sleeve of FIG. 8A.
Figure 9A:
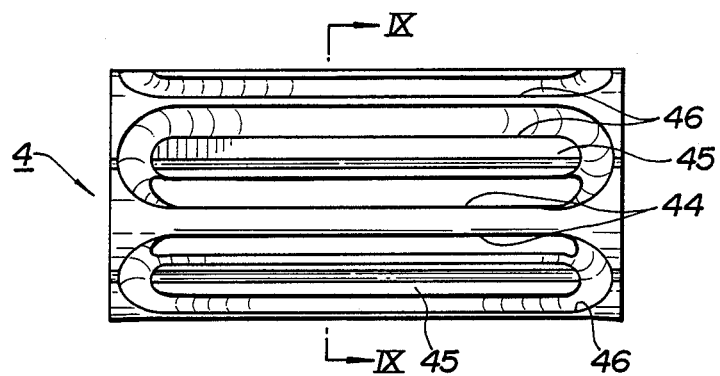
FIG. 9A is a front elevational view of a retainer mounted in the spline outer sleeve FIGS. 8A and 8B.
Figure 9B:
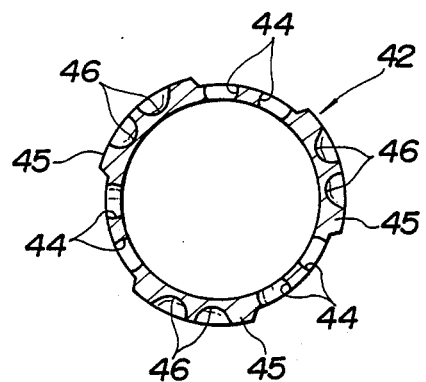
FIG. 9B is a sectional view taken along the line IX—IX of FIG. 9A.
Figure 10B:
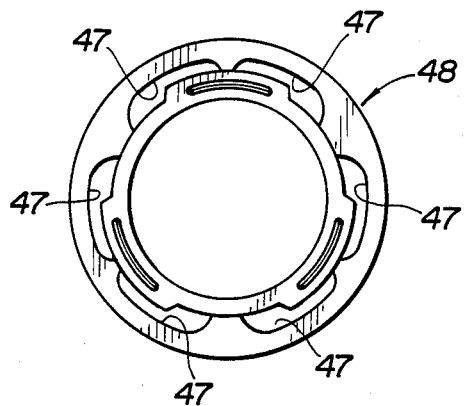
FIG. 10B is a front elevational view of the end cap shown in FIG. 10A.
Figure 10A:
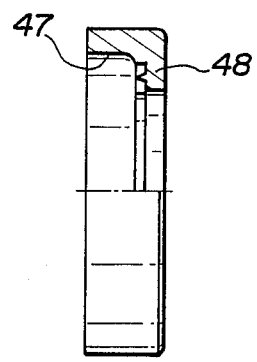
FIG. 10A is a vertical sectional view of an end cap attached to each end of the retainer shown in FIG. 9.
Figure 11:
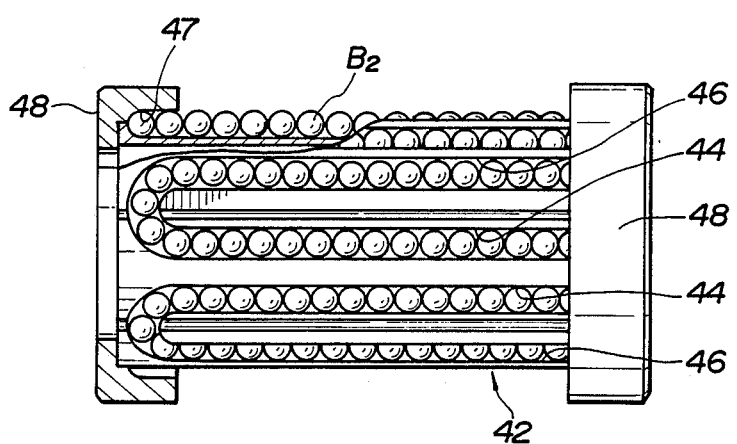
FIG. 11 is an illustration of the assembly of the retainer and the end cap.
Figure 13A:
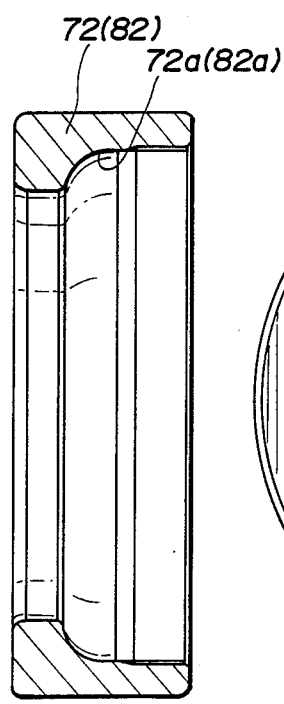
FIG. 13A is a vertical sectional view of the outer race of another support bearing.
Figure 13B:
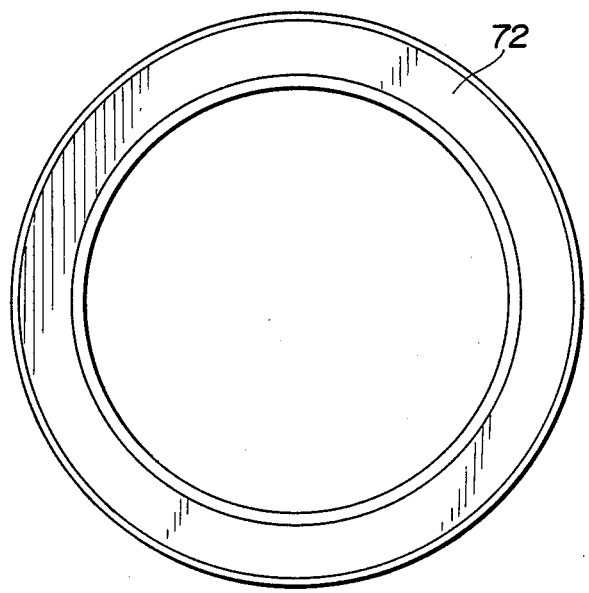
FIG. 13B is a front elevation view of the outer race shown in FIG. 13B.
Figure 14:
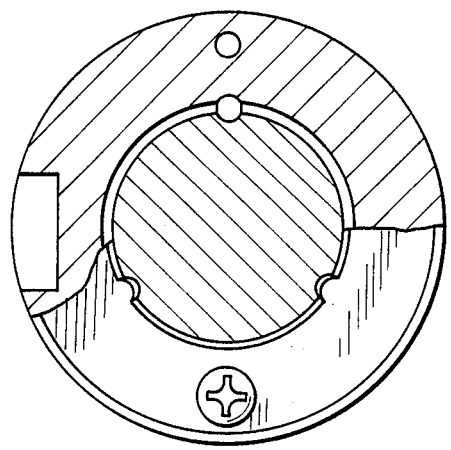
FIG. 14 is a vertical sectional view of a conventional radial-type ball spline.

The balls $B_1$ disposed between the nut 3 and the shaft 2 are axially pre-loaded. Although the pre-loading can be effected in various ways, the described embodiment adopts such a pre-loading means that, as schematically shown in FIG. 3, the pitch of the screw grooves 33 in the nut, as well as the pitch of the grooves on the shaft 2, are slightly varied in the direction of axis. More precisely, referring to FIG. 3, the pitches $P_1$, $P_2$ ($P_1$ may be equal to $P_2$) of the grooves 33, 33 in the axially mid portion of the nut is greater than those $P_3$, $P_4$ ($P_3$ may be equal to $P_4$) of the same grooves at other axial portions, such that the conditions are met as $P_1$, $P_2=P_3+\alpha$ and $P_1$, $P_2=P_4+\alpha$. In consequence, the loaded balls $B_{11}$ on the left side of the axially mid portion of the nut 3 are urged to the left, while the loaded balls $B_{12}$ on the right side of the same are urged to the right, whereby these balls are axially preloaded. Alternatively, the arrangement may be such that the pitches $P_1$, $P_2$ are selected to be smaller than the pitches $P_3$, $P_4$ so as to meet the conditions of $P_1$, $P_2=P_3-\alpha$ and $P_1$, $P_2=P_4-\alpha$, thereby pre-loading the left loaded balls $B_{11}$ and the right loaded balls $B_{12}$ axially inwardly.

The pre-loading also may be effected by other suitable methods such as the use of a double-nut structure which employs a spacer placed between a pair of nuts.

The spline outer sleeve 4 has a cylindrical member the inner peripheral surface of which has six axial ball rolling grooves 41 corresponding to the ball spline grooves 23 formed on the outer peripheral surface of the shaft 2. A multiplicity of balls $B_2$ are disposed between the ball rolling grooves 41 of the sleeve 4 and the ball spline grooves 23 on the shaft 2. A ball retainer 42 desinged to guide and hold the balls $B_2$ is received in the bore of spline outer sleeve 4. The balls $B_2$ are pre-loaded in the direction approximately the direction of rotation.

More specifically, the spline outer sleeve 4 is provided on the inner peripheral surface thereof with three axially-extending radially inward protrusions 43 which are equally spaced in the circumferential direction, A pair of the ball running grooves 41 corresponding to the ball spline groove 23 are formed in each of these axially-extending protrusions. The pre-loading mechanism will be described with reference to FIG. 4 which shows the principle of pre-loading effected by each of the protrusions 43. Each protrusion 43 has a recess 43a in the radially inner end surface thereof. A pair of ball rolling grooves 41, 41 are formed in opposite circumferential ends of the recess 43a. These ball rolling grooves 41,41 cooperate with the ball spline grooves 23,23 in clamping therebetween the balls $B_1$, $B_2$, whereby the balls $B_2$ are pre-loaded substantially in the directions of rotation, thus eliminating any substantial angular lash, i.e., looseness in the direction of rotation. It will also be seen that each ball $B_2$ is supported in a direction defined by a line interconnecting the points at which the ball $B_2$ contacts the groove surfaces, the line forming a predetermined angle $\beta$ with respect to a radial line radiating from the center of the shaft. Preferably, this angle, referred to as "contact angle $\beta$", is selected to be about 45°.

The pre-loading of the balls $B_2$ may be effected by other suitable means, provided that it can pre-load the balls $B_2$ in a direction approximating the directions of rotation.

The retainer 42 is constituted by a thin-walled cylindrical form, having a plurality of slits 44 radially aligning with the ball rolling grooves 41 so as to be able to guide the loaded balls. The retainer 42 also has radially outward ridges 45, 45, 45 adapted to fit in the recessed portions between the radially inward protrusions 43,43,43 on the inner peripheral surface of the spline outer sleeve 4. The ridges 45,45, 45 are so sized that the radially outer ends thereof fit on the bottoms of the recessed portions mentioned above. Each ridge 45 is provided with ball recirculating grooves 46 along which the balls are recirculated. An end cap 48 is welded to each axial end of the retainer 42. The end cap 48 is provided with ball turning grooves 47 through which the loaded balls $B_2$ which has been guided along the slits 44 are introduced into the passages formed by the ball recirculating grooves.

The housing 10 in which the composite motion guide unit 5 is assembled has a bore 13 for receiving the shaft 2. The inner peripheral surface of the housing 10 defining the bore 13 rotatably carries the ball screw nut 3 and the ball spline outer sleeve 4 of the guide unit 5, through respective ball bearings 6 to 9. The ball screw nut 3 and the spline outer sleeve 4 are positioned as closely as possible to each other in the axial direction, thereby to reduce the size of the whole device. It is also to be understood that the spline outer sleeve 4 has an outside diameter equal to the nut 3, so that the bore 13 in the housing 10 is desinged as a straight bore having no step. This arrangement enables the nut 3 and the spline outer sleeve 4 to be automatically centered in the course of the assembly. It is therefore possible to ensure a smooth motion of the shaft 2 both in the axial and rotational directional.

The ball screw nut 3 is supported in the housing 10 through a pair of support bearings 6, 7 which are disposed on the outer peripheral surface of the nut member 31 at both axial end portions thereof. More specifically, ball rolling surfaces 61, 71 for balls $B_6$, $B_7$ of the bearings 6,7 are formed in the axial end portions of the outer peripheral surface of the nut member 31, while the outer races 62,72 of the bearingss 6, 7 fit in the bore 13 of the housing 10. The outer race 62 of the bearings 6 which is disposed on the axially outer side has a mounting flange which projects radially outwardly therefrom, and is fixed by bolts 14 to the end adjacent end surface of the housing 10.

Thus, the support bearings 6,7 are constructed as angular contact bearings in which the balls $B_6$, $B_7$ of the bearings 6, 7 contact the ball rolling surfaces $62a$, $72a$ on the outer race and the ball rolling surfaces 61, 71 on the nut member 31 such that the lines interconnecting the contact points are inclined with respect to radial lines. Thus, the bearings 6,7 are arranged in a back-to-back relation, and make use of the nut member 31 as the inner race, whereby the necessity for the provision of separate inner race members is eliminated. The described arrangement for supporting the ball screw nut 3, however, is only illustrative and the support may be provided by radial bearings or bearings which are disposed in a face-to-face relation.

The balls $B_6$, $B_7$ of the support bearings 6,7 are pre-loaded. The pre-loading is effected in this embodiment by a spacer 15 which is disposed between the outer races 62 and 72 of the bearings 6 and 7. It is possible to adjust the level of the pre-load by selectively using the spacers of different axial lengths. Other pre-loading methods can be used such as to construct the spacer 15 with a piezoelectric element so as to enable control of the axial length of the spacer or to use a hydraulic means which provide controllable urging forces to urge both outer races away from each other.

The spline outer sleeve 4 also is supported in the housing 10 through a pair of support bearing 8, 9 of angular contact type, arranged in a back-to-back relation. The support bearings 8,9 have ball rolling surfaces $82a$, $92a$ along which the balls $B_8$, $B_9$ of the bearings 8, 9 roll, and outer races 82, 92 which fit in the bore 13 of the housing 10. The outer race 92 of the bearing 9 which is disposed on the axially outer side has a mounting flange 93 which projects radially outwardly therefrom and which is fastened by bolts to the end surface of the housing 10 opposite to the nut 3.

As in the case of the ball screw nut 3, a spacer 16 provided between the outer races 82, 92 of the support bearings 8, 9 serve to pre-load the balls $B_8$, $B_9$ of the support bearings 8, 9.

In the described embodiment, the nut 3 and the spline outer sleeve 4 are driven through belts which engage with a nut dividing pulley 11 and a sleeve driving pulley 12 which are secured to the end surfaces of the nut 3 and the spline outer sleeve 4, respectively, so as to serve as power transmitting members. More specifically, the nut driving pulley 11 has a ring-like form and is fastened to an end surface of the nut 31 by means of the bolts 14. The outside diameter of the pulley is substantially the same as that of the mounting flange 63 of the support bearing 6. The inner peripheral end of the pulley 11 is disposed in the close proximity of the surface of the shaft 2. On the other hand, the sleeve driving pulley 12 also is a ring-shaped member fixed to an end surface of the outer sleeve 14 by means of the bolts 14. The pulley 12 has an outside diameter which is substantially the same as that of the mounting flange 93, i.e., the same as that of the nut driving pulley 11.

Although various types of transmission belts are usable, the use of timing belts is preferred from the view point of precise control of the feed. Obviously, the use of belts as the power transmission means is not exclusive and the invention can be well carried out by using chain- or gear-type drive systems. In such cases, the pulleys are substituted by sprockets or gears depending on the selected drive system.

The composite motion guide device 1 having the described construction is used, for example, in a robot by being fixed at its housing 10 to a mounting member 19 on the robot body by means of bolts 20. In operation, the ball screw nut driving pulley 11 and the ball spline outer sleeve driving pulley 12 are driven selectively such that either one or both of these pulley rotate, whereby the shaft 2 makes rotational motion, axial reciprocating motion or a composite motion composed of rotation and axial movement.

The balls $B_1$ between the ball grooves 22 and 33 in the shaft 2 and the nut 3 are pre-loaded in the axial direction. In addition, the balls $B_6$, $B_7$ of the angular-contact type supporting bearings in support of the nut 3 are also pre-loaded in the axial direction. Therefore, the balls $B_1$, $B_6$ and $B_7$ are never deformed elastically by the force of inertia even when the shaft 2 is abruptly stopped during axial movement, thus preventing any vibratory motion.

This in turn ensures that the delay of phase at the time of start-up of the apparatus is eliminated, while the precision of axial positioning is enhanced. Moreover, the axial vibration of the shaft 2 with respect to the housing 10 can be avoided because the axial looseness is eliminated. This in turn eliminates any vibratory sliding of balls in the spline outer sleeve 4 which is mounted in the same housing 10, whereby the fletching corrosion of the ball rolling surfaces can be prevented.

Any looseness of the shaft 2 in the direction of rotation also is completely avoided because the balls $B_2$ interposed between the spline outer sleeve 4 and the shaft 2 are pre-loaded in the direction of rotation. It is therefore possible to eliminate any delay of phase at the time of start-up of the apparatus and to impove the positional precision in the direction of rotation. Furthermore, the minute rotational vibration of the shaft 2 is eliminated so that the fletching corrosion on the nut 3, attributable to the rotational looseness of the spline outer sleeve 4, can be prevented.

The radial play or looseness of the spline outer sleeve 4 can be completely eliminated if the balls $B_8$, $B_9$ of the support ball bearings 8,9 on the spline outer sleeve 4 are arranged in an angular-contact manner and suitably pre-loaded. In consequence, the oscillation of the shaft 2 is prevented to eliminate any moment acting on the nut which may otherwise be caused by oscillatin of the shaft 2. This in turn ensures that the balls $B_1$ on both axial ends of the nut 3 will never be overloaded, thus enabling the balls $B_1$ to smoothly operate for a long time.

The radial looseness of the spline outer sleeve 4 also allows the shaft 2 to vibrate, so as to cause fletching corrosion on the nut 3. According to the invention, it is possible to suppress this undesirable effect.

It is also to be understood that the elimination of the inner races of the support bearings 6 to 9 contributes to a reduction in the number of parts and, hence, of the size of the whole device. The reduce number of the parts correspondingly reduces any error which may be incurred in the course of mounting.

The present invention offers the following advantages by virtue of the construction and operation described hereinabove.

Firstly, it is to be noted that higher levels of rigidity are attained both in the axial and rotational directions, thanks to the pre-loading of the balls between the nut and the shaft and the pre-loading of balls of the angular-contact type support bearings in support of the nut, as well as the pre-loading of the balls between the spline outer sleeve and the shaft in the rotational direction. In consequence, play or looseness of the shaft is eliminated both in the axial and rotational directions, so as to ensure an improved response characteristic and positioning precision.

The elimination of the looseness of the spline outer sleeve in the direction of rotation effectively prevents fletching corrosion on the nut which may otherwise be caused by vibration of the shaft attributable to vibration of the shaft when the shaft is stopped. In addition, the elimination of the axial play or looseness of the nut effectively prevents fletching corrosion of the spline outer sleeve, thus ensuring a smooth operation of the guide device.

It is also to be noted that the use of pre-loaded angular-contact type support bearing in support of the spline outer shaft eliminates radial play of the spline outer sleeve, thus preventing oscillation of the shaft and consequent overloading of the balls in the nut due to moment of force generated as a result of the shaft oscillation, as well as fletching corrosion of the balls in the nut.

Furthermore, the nut and the spline outer sleeve are supported with high degrees of rigidity because each of them is supported by a pair of pre-loaded angular-contact type bearings, whereby the load bearing capacity is increased both in the axial and radial directions, as well as against moment load.

According to the invention, it is thus possible to obtain a composite motion guide device having a wide adaptability.

What is claimed is:

1. A composite motion guide device comprising:
   a single shaft means provided with helical ball screw grooves formed in an outer peripheral surface thereof and ball spline grooves formed in the outer peripheral surface thereof so as to extend in an axial direction of the shaft across the ball screw grooves, the respective ball screw grooves and ball spline grooves having groove depths equal to each other;
   a ball screw nut mounted on said shaft means and provided with ball rolling grooves being engageable with said ball screw grooves through loaded balls;
   a hollow ball spline outer cylinder mounted on said shaft means and provided with ball rolling grooves being engageable with said ball spline grooves through loaded balls;
   a retainer means disposed in a bore of said spline outer cylinder, said retainer means being of a thin walled cylindrical form and having slits disposed facing the ball rolling grooves, the slits having opposed curved surfaces for receiving and guiding loaded balls in the longitudinal direction of the shaft, the opposed surfaces being defined by a diameter substantially equal to a diameter of the loaded balls;
   a number of balls rolling in said ball screw grooves and ball spline grooves;
   means for independently driving said nut and said spline outer cylinder from each other;
   means for pre-loading the balls interposed between said nut and said shaft means in an axial direction thereof;
   means for pre-loading balls incorporated in said support bearing in support of said nut; and
   means for pre-loading balls interposed between said spline outer cylinder and said shaft means in a substantially rotating direction thereof.

2. The composite motion guide device according to claim 1 wherein the pre-loading to the balls interposed between said nut and said shaft is imparted by a difference in pitches between pitches of a ball-rolling groove formed in an inner periphery of said nut and pitches of the ball screw groove of the shaft.

3. The composite motion guide device according to claim 1 wherein said means for pre-loading the balls in said support bearing comprises a spacer disposed between outer races of said paired support bearings.

4. The composite motion guide device according to claim 1 wherein the pre-loading to the balls interposed between said spline outer sleeve and said shaft is imparted by locations of the ball spline groove formed in the shaft and ball-rolling groove formed at a corner portion of a recessed portion formed in a protruded portion of an inner periphery of the spline outer sleeve.

5. The composite motion guide device according to claim 1 wherein said support bearing in support of the nut is constructed to be of angular contact type.

6. The composite motion guide device according to claim 1 wherein said support bearing in support of said spline outer sleeve is of angular contact type with the balls pre-loaded.

7. The composite motion guide device according to claim 1 wherein said support bearings in support of said nut and said spline outer sleeve have inner races constituted by surfaces of said nut and said outer spline sleeve, outer races stationary formed in said housing, and balls which roll in a gap between said inner and outer races.

8. The composite motion guide device according to claim 1, wherein said retainer means is provided with a plurality of slits radially aligned with the ball rolling grooves so as to be able to guide the loaded balls.

9. The composite motion guide device according to claim 1, wherein said retainer means is provided with radially outward ridges adapted to fit in recessed portions between radially inward protrusions on an inner peripheral surface of said spline outer sleeve, each of said ridge being provided with ball recirculating grooves along which the balls are recirculated.

* * * * *